United States Patent [19]
Abraham et al.

[11] Patent Number: 4,699,855
[45] Date of Patent: Oct. 13, 1987

[54] STORAGE BATTERY HAVING A PROTECTIVE SHIELD

[76] Inventors: Carl J. Abraham, 3 Baker Hill Rd., Great Neck, N.Y. 11023; Malcolm Newman, 12 Beal Ct., Huntington, N.Y. 11743; Stanley Bindman, 34 Shelter La., Roslyn Heights, N.Y. 11577

[21] Appl. No.: 882,287

[22] Filed: Jul. 7, 1986

[51] Int. Cl.[4] .............................................. H01M 2/04
[52] U.S. Cl. .................................... 429/175; 429/177; 429/122
[58] Field of Search ................ 429/122, 175, 177, 82, 429/84, 87–89, 163

[56] References Cited

U.S. PATENT DOCUMENTS

| | | | |
|---|---|---|---|
| 1,424,144 | 7/1922 | Kunkel | 429/177 |
| 2,186,148 | 1/1940 | Raney | 429/177 X |
| 2,319,533 | 5/1943 | Codney | 429/175 X |
| 2,452,066 | 10/1948 | Murphy | 429/177 X |
| 2,692,905 | 10/1954 | Fischbach et al. | 429/177 |
| 2,707,721 | 5/1955 | Anderson et al. | 429/100 |
| 3,146,132 | 8/1964 | Nathan | 429/100 |
| 4,278,742 | 7/1981 | Oxenreider et al. | 429/175 X |
| 4,463,069 | 7/1984 | Greenlee | 429/88 X |

Primary Examiner—Anthony Skapars
Attorney, Agent, or Firm—Alan H. Levine

[57] ABSTRACT

A storage battery provided with a cover, having an inverted generally U-shaped cross-section, located over the top wall of the battery casing, both ends of the cover being open. The cover may be formed integrally with the casing top wall, or it may be a separate member. If a separate member, resilient straps or other retaining elements are employed to secure the cover to the battery casing, and ribs or other positioning elements carried by the cover engage the casing and space the cover from the casing top wall. Preferably, the cover is semi-cylindrical, is imperforate, and if a separate element, may be flexible.

19 Claims, 7 Drawing Figures

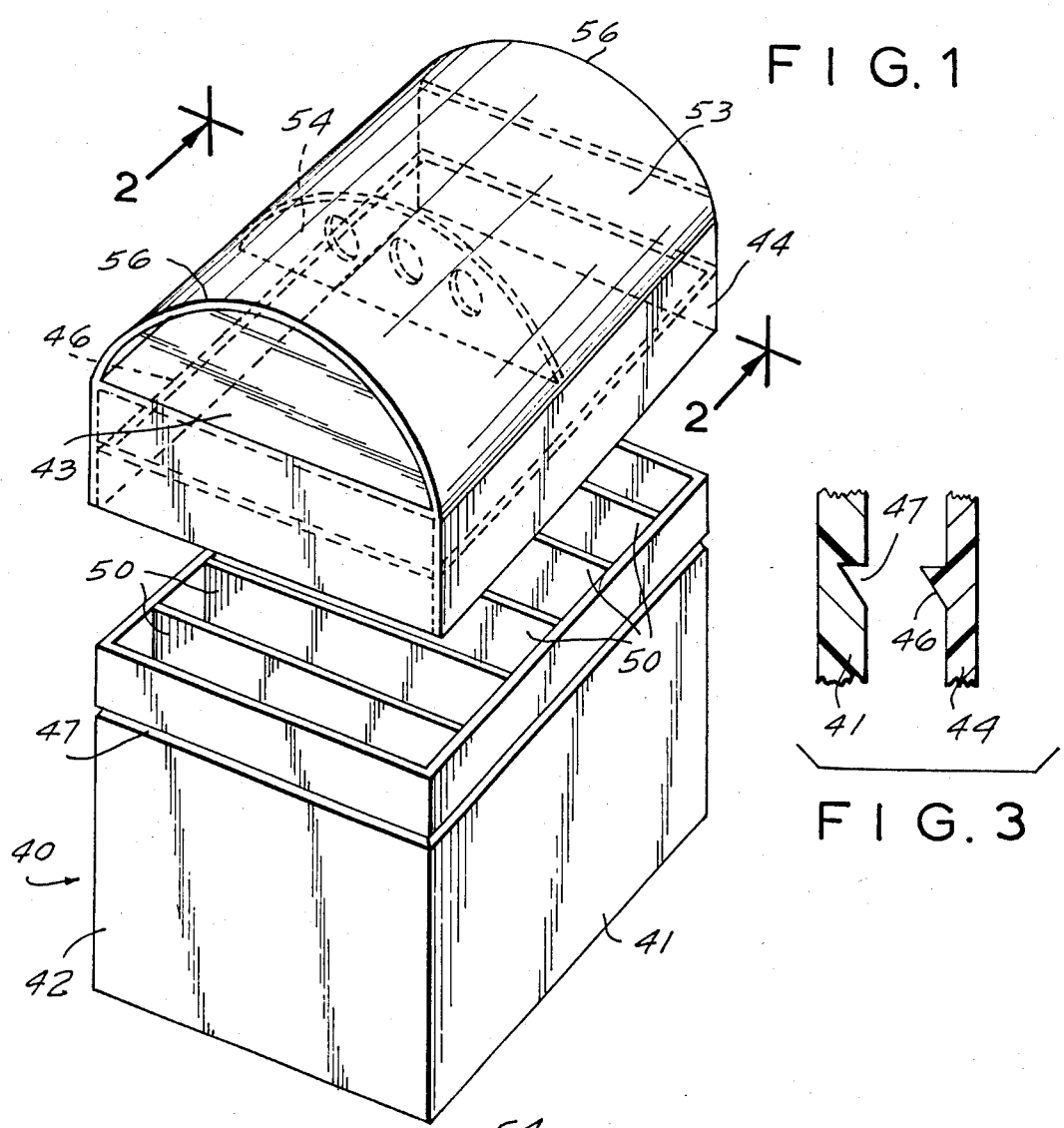
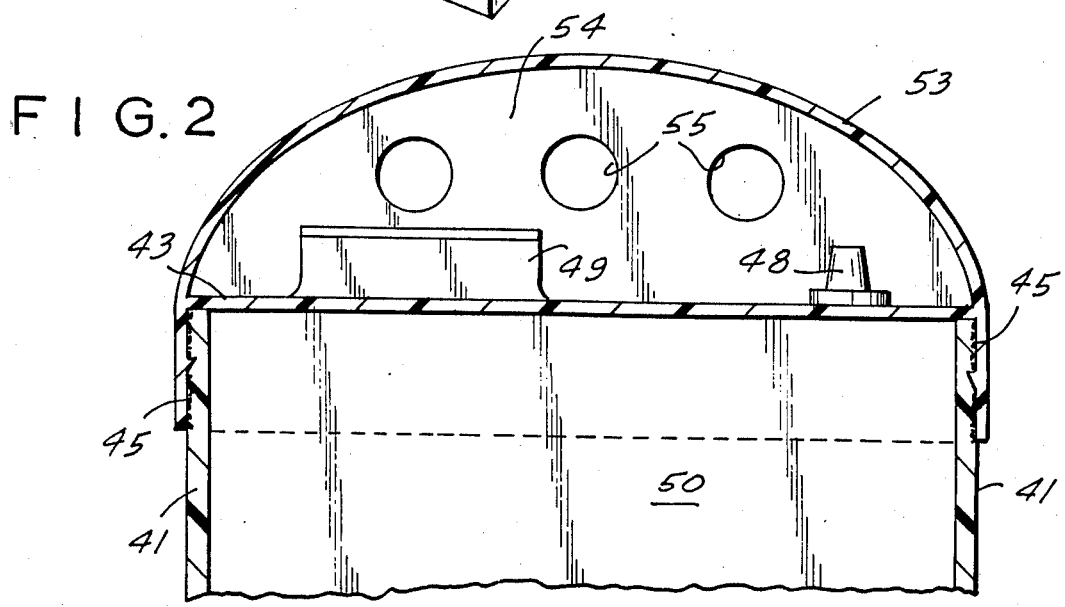

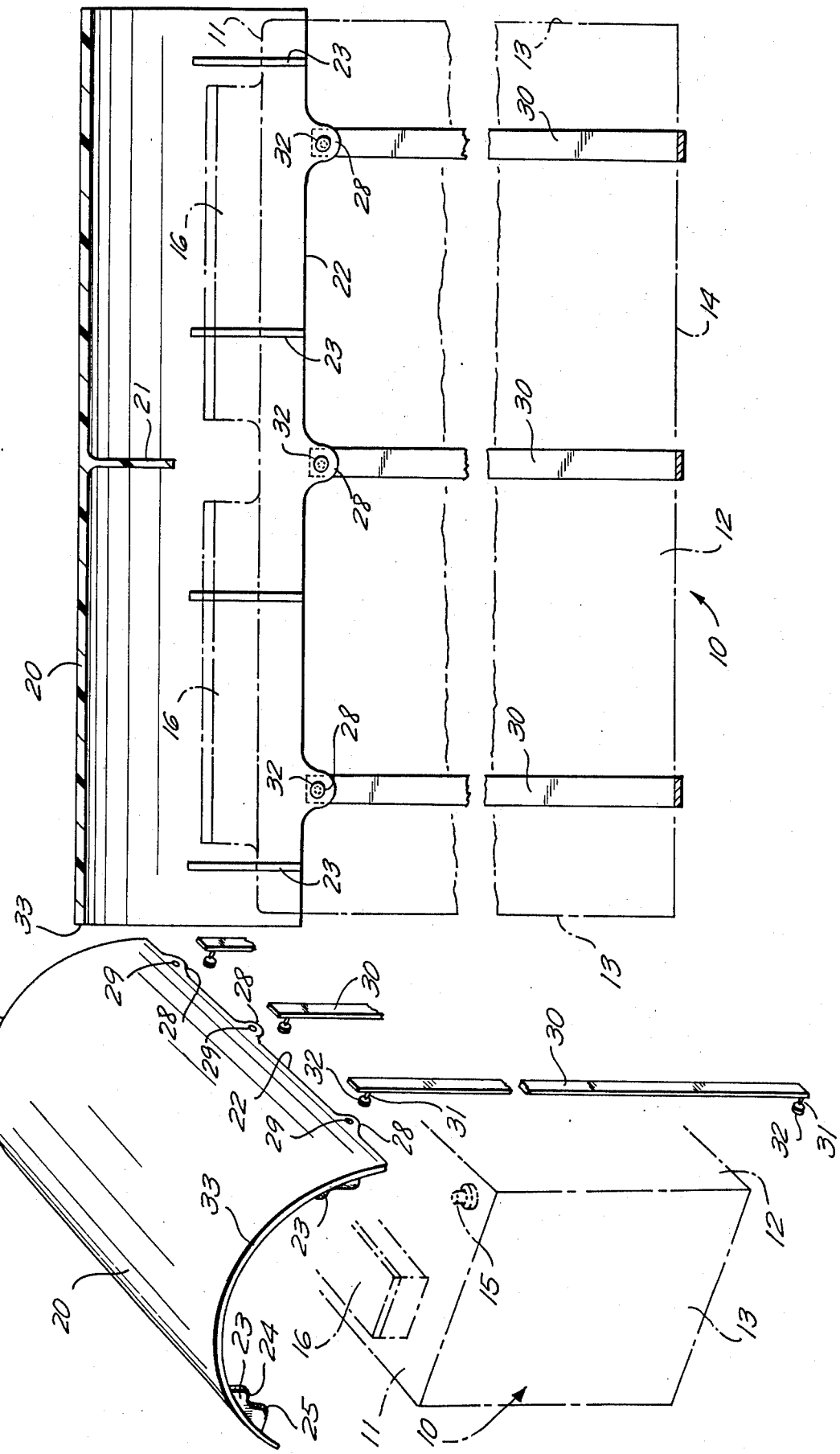

STORAGE BATTERY HAVING A PROTECTIVE SHIELD

This invention relates to storage batteries, and more particularly to protection in the event such a battery explodes.

Storage batteries, such as those used in most automobiles, comprise a number of electrolytic cells. The cells include metal electrodes and an electrolytic liquid, typically sulfuric acid. As such a battery is used, it generates hydrogen and oxygen gases within the battery casing. To limit the build-up of pressure within the casing resulting from creation of the gases, it is common to provide the top wall of the battery casing with a vent cap located over each cell. The hydrogen and oxygen gases generated within the battery casing are vented to the atmosphere through the vent caps.

A problem presented by storage batteries involves the fact that a spark or flame in the vicinity of the battery can ignite the hydrogen being vented, and often such ignition can propagate back through the vent cap into the interior of the battery casing, resulting in an explosion of the hydrogen within the casing. Should the explosion cause a rupture of the top wall of the battery, someone working near the battery is in danger of being hit by a piece of the battery top wall, and being sprayed with sulfuric acid from within the battery.

In attempts to avoid this problem, vent caps provided with flame arresting capabilities have been proposed. The purpose of the flame arrestor is to prevent propagation of flame through the vent cap into the interior of the battery. Examples of such vent caps are shown and described in U.S. Pat. Nos. 4,091,180; 4,107,399; 4,294,896; and 4,317,868.

Flame arresting vent caps do not, however, completely solve the problem described above. The reason is that they are not always effective in all situations. In addition, sparks can be generated within the battery itself, such as by reason of a loose connection between an electrode and a conductor connected to it. Thus, other approaches have been suggested for dealing with the explosion potential of storage batteries. U.S. Pat. No. 4,168,350 discloses an explosion resistant battery cover. Each of U.S. Pat. Nos. 4,245,010 and 4,250,232 suggests providing the battery casing with weakened blow-out areas, so as to control the fracture of the battery casing when an explosion occurs. These designs have not been entirely successful. For example, an exploding battery does not always fracture at the blowout area, but rather at some other unpredicted location.

Other attempts to solve the battery explosion problem involve providing a heat-absorbing material within the battery (U.S. Pat. No. 4,169,918) and providing a compressible material within the battery (U.S. Pat. No. 3,846,178).

The present invention is based on the realization that completely preventing explosions of storage batteries will not be possible within the foreseeable future. Therefore, it is an object of the present invention to minimize the danger of a battery explosion to the person working on or near the battery.

This objective is achieved, according to the invention, by providing a protective shield located above the battery casing top wall so as to deflect both acid spray and pieces of the casing top wall, and prevent them from striking a person who is in the vicinity of the battery.

It is a further object of the invention to provide a protective shield which is spaced above the top wall, and is formed so that the pressure produced beneath the shield during an explosion can emerge from the shield in a lateral direction, thereby minimizing or eliminating danger to a person working over the battery.

It is another object of the invention, in one of its embodiments, to provide a protective shield formed integrally with the top wall of the battery casing.

It is an additional object of the invention, according to another embodiment, to provide such a shield as a separate member which can be mounted on standard storage batteries without requiring any change in fabrication of those batteries.

Other objects and features of the invention will be apparent from the following description, in which reference is made to the accompanying drawings.

In the drawings:

FIG. 1 is a perspective view of one embodiment of a storage battery having a protective shield, according to this invention;

FIG. 2 is a fragmentary cross-sectional view taken along line 2—2 of FIG. 1;

FIG. 3 is a view similar to a part of FIG. 2, showing the parts separated;

FIG. 4 is an exploded perspective view of an alternative embodiment showing a conventional storage battery and a separate protective shield according to this invention;

FIG. 7 is a longitudinal cross-sectional view taken along line 7—7 of FIG. 5.

Figure 5:
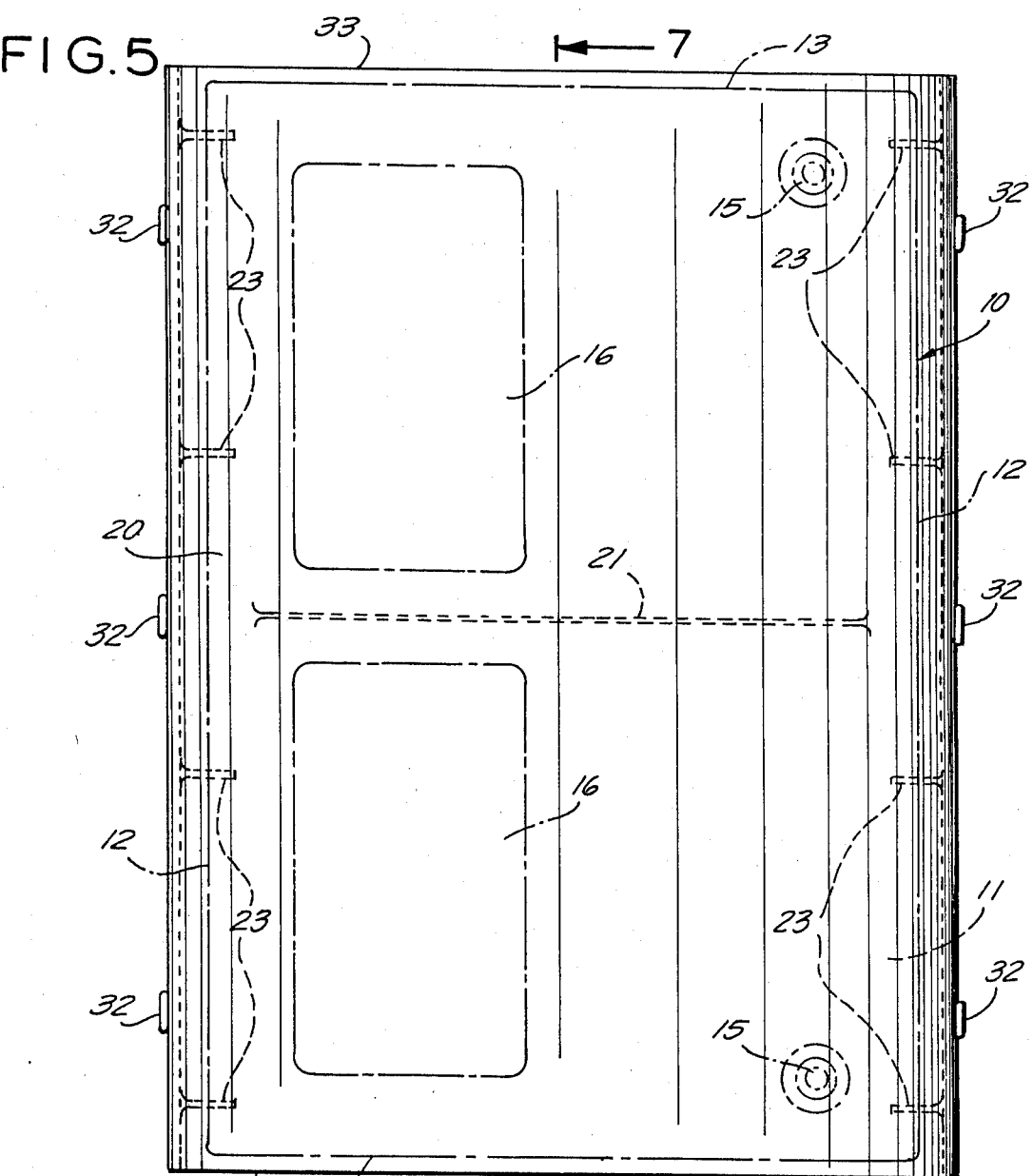
FIG. 5 is a top view of the protective shield mounted on the battery.

One embodiment chosen to illustrate the present invention, and shown in FIGS. 1–3, involves a storage battery 40 including a casing having two side walls 41, two end walls 42 (only one each of these walls being shown in FIG. 1), and a top wall 43. The top wall forms part of a cap for the battery casing, the cap also including a lip 44 depending from the periphery of the top wall. Lip 44 is sized to snugly accommodate the upper ends of casing side and end walls 41 and 42 (as indicated in FIG. 2). The lip is permanently fixed to the side and end walls by a suitable adhesive 45 between the inner face of the lip and the outer faces of the side and end walls. To help insure a permanent connection between the cap and the remainder of the battery casing, interlocking elements are provided on the lip and side and end walls. In this example, the interlocking elements include a sharp ridge 46, projecting inwardly from the inner face of lip 44, which snaps into a cooperating groove 47, formed in the outer faces of side and end walls 41 and 42. Upstanding on top wall 43 are two battery terminals 48 (only one shown in FIG. 2), for connection to battery cable clamps, and covers 49 which enclose gas venting means for the individual cells 50 of the battery. Although, for the sake of convenience, the compartments for cells 50 are shown empty in FIG. 2, these compartments contain the usual electrodes and electrolytic liquid found in storage battery cells.

According to the invention, top wall 43 is integrally formed with a cover 53, having an inverted generally U-shaped cross-section. In this example, the cover has a semi-cylindrical shape; however, other inverted U-shapes could be used, such as an inverted channel shape or V-shape. Preferably, top wall 43, cover 53, and lip 44 are formed as one piece of molded plastic. Desirably, a strengthening web 54 extends crosswise of the cover and top wall at a point about midway between the ends of these parts, the web spanning the distance between the cover and top wall. Web 54 is furnished with holes 55 which permit flow of gases across the web. The web may be molded as one piece with the top wall and cover. Cover 20 should, of course, be imperforate, so that pieces of the casing, and acid, from an exploding battery cannot pass through the cover.

Should a battery 40, provided with a protective cover 53, explode in such a way that top wall 43 ruptures, cover 53 will prevent pieces of the top wall, and spraying sulfuric acid, from reaching a person working over the battery. However, the pressure of the explosion is readily relieved, since it can flow longitudinally through the space between top wall 43 and cover 53 and out through the open ends of the cover, i.e., beyond the end edges 56 of the cover. Regardless of where the top wall ruptures, explosive gases can flow out through the open end of the cover closest to the rupture, and also through holes 55 to the other open end of the cover. With the battery located in the usual well provided in an automobile, pressure of the explosion, and parts of the battery, flowing outwardly past the ends of the cover, are unlikely to cause any serious injury to a person working near the battery.

The secure bonding of the cap 43, 44, 53 to the side and end walls 41 and 42 of the casing by adhesive 45 and interlocking elements 46 and 47, insures that an explosion will not cause the entire cap to blow off. Battery cables can be attached to terminals 48 through the open ends of cover 53. Alternatively, the terminals can be located on one of the side or end walls of the battery.

Figure 6:
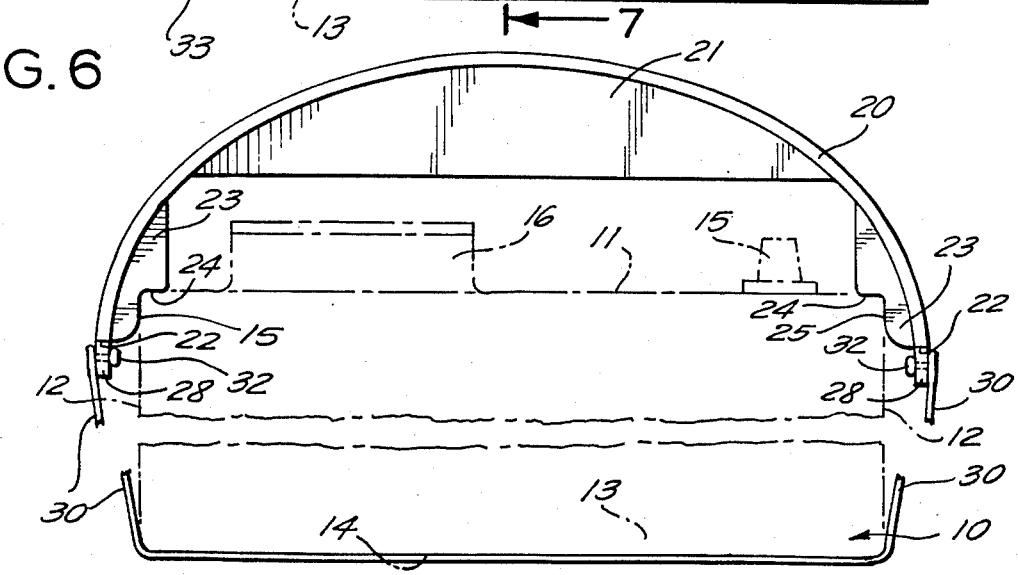
FIG. 6 is an end elevational view showing the protective shield mounted on the battery.

In the embodiment of the invention described above, protective cover 53 is integral with the top wall 43 of the battery casing. Alternatively, the cover could be a separate member, as shown in FIGS. 4–7, intended for use with a conventional parallelepiped-shaped storage battery 10, shown in dot-dash lines in the drawing, including a casing having a top wall 11, side walls 12, end walls 13, and a bottom wall 14. Upstanding on top wall 11 are two battery terminals 15, for connection to battery cable clamps, and two covers 16 which enclose gas venting means for the individual cells of the battery.

The protective shield chosen to illustrate this embodiment of the invention includes an inverted, generally U-shaped, in this case generally semi-cylindrical-shaped, cover 20. Here again, the cover could have other generally U-shapes. The cover may be formed in any convenient manner, such as from an initially flat piece of sheet metal bent to the shape shown, or preferably cover 20 is formed of molded plastic. In any case, it is important that the material of the cover have some degree of flexibility, so that it will be useable with batteries having different widths. The length of cover 20 should be such that it will completely cover the top wall 11 of all, or most, storage batteries for automotive use now on the market. Cover 20 should, of course, be imperforate, so that pieces of the casing, and acid, from an exploding battery cannot pass through the cover.

At about the longitudinal center of cover 20, it is formed with a web 21 extending across the upper region of the cover. This web helps to rigidify the cover, especially when it is made of plastic. However, since the web is located only in the upper region of the cover, it does not interfere with the flexibility of the side portions of the cover between the web 21 and the longitudinal edges 22 of the cover.

Projecting inwardly from the interior faces of these side portions of the cover are ribs 23 which serve to position the cover with respect to a battery. In this example, four ribs 23 are shown along each side of cover 20. When the cover is formed of molded plastic, cover 20, web 21, and ribs 23 may be integrally formed as one piece. Each rib preferably has a stepped configuration, so that it accommodates the corner of a battery casing at which the top wall 11 and one of the side walls 12 meet. Specifically, one surface 24 (FIG. 6) of each rib 23 seats upon top wall 11 of the casing, and another surface 25, perpendicular to surface 24, seats against a side wall 12 of the casing. Ribs 23, seating upon top wall 11, serve to space cover 20 above the top wall. Ribs 23 seating against the side walls 12 of the battery serve to space the longitudinal edges 22 of the cover away from the side walls 12. Furthermore, because the stepped configurations of ribs 23 are located above the longitudinal edges 22 of the cover, these longitudinal edges are located below the top wall 11 of the battery when the cover is in place on the battery (See FIGS. 6 and 7).

Each longitudinal edge 22 of cover 20 is formed with a series of spaced apart tabs 28, each tab having an aperture 29. Flexible straps 30 are provided, each strap being provided at each end with a snap fastener type stem 31 formed at its free end with an enlarged head 32. The diameter of aperture 29 in each tab 28 is smaller than the diameter of head 32. However, due to the inherent flexibility of the cover material, head 32 can be snapped through aperture 29 so as to connect strap 30 to tab 28, as shown most clearly in FIG. 6. Although straps 30 are shown for retaining the cover on a battery, other types of retaining means could be employed, as long as they securely attach the cover to the battery so that the cover will not be blown off by the force of a battery explosion. Also, fasteners other than the snap fasteners 28, 29, 31, 32 described above could be used to join straps 30 to cover 20.

When it is desired to mount cover 20 on a battery 10, the cover is placed over the battery so that surfaces 24 of ribs 23 rest upon top wall 11 of the battery. If the battery happens to be relatively wide, the cover may have to be sprung outwardly slightly so that surfaces 25 of ribs 23 can be brought into engagement with battery side walls 12. If the battery is relatively narrow, the sides of the cover may have to be pressed inwardly to bring surfaces 24 into engagement with top wall 11. Straps 30 are then secured to cover 20 by means of the snap fastener arrangement described above. Specifically, the head 32 at one end of a strap 30 is pressed through an aperture 29 in one of the tabs 28. The strap is then drawn down along one side wall 12 of the battery, across bottom wall 14, and up along the other side wall 12, and head 32 at the other end of the strap is pressed through aperture 29 of a tab 28 along the other longitudinal edge 22 of the cover. Straps 30 are preferably formed of an elastic material so that they tightly pull ribs 23 into engagement with the battery. Once all these straps 30 have been secured to tabs 28, as described above, cover 20 is completely mounted on battery 10.

With cover 20 in place on the battery, as described above and shown in FIGS. 5–7, should the battery explode in such a way that top wall 11 ruptures, cover 20, like cover 53, will prevent pieces of the top wall, and spraying sulfuric acid, from reaching a person working over the battery. On the other hand, the pressure of the explosion is readily relieved, since it can flow longitudinally beneath the cover and out through the open ends of the cover, i.e., beyond end edges 33 of the cover, which are unobstructed. In addition, in this case, because longitudinal edges 22 of the cover are spaced from side walls 12 of the battery, the pressure of the explosion is also relieved by flowing out from under the cover and downwardly between the side portions of the cover and side walls 12 of the battery.

As described above, the separate cover is a universal cover useable with batteries of different sizes. If desired, a separate cover could be produced for use with a battery of one particular size. In such case, the cover need not be flexible, since it would not have to be adjustable for assembly with batteries of different widths. It may also be mentioned that a battery usually carries a printed safety warning on its top wall; however, the space for such a warning is limited because the gas vents and terminals may occupy some of the top wall space. The present invention offers the advantage of providing unobstructed space, on the outer surface of the cover 53,20 for accommodating a much larger warning than can now be accommodated by the battery top wall.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A storage battery comprising:
an outer casing including a top wall,
a cover, having an inverted generally U-shaped cross-section, located over the casing top wall, both ends of the cover being open so that any gases within the space between the cover and top wall can flow to the atmosphere through the open ends of the cover, and
retaining means for securing the cover to the battery casing.

2. A storage battery as defined in claim 1 wherein the length and width of the cover are about equal to the length and width of the battery casing.

3. A storage battery as defined in claim 1 wherein the cover has a generally semi-cylindrical shape.

4. A storage battery as defined in claim 1 wherein the cover is imperforate.

5. A storage battery as defined in claim 1 wherein the cover and casing top wall are integrally formed as a single piece of molded plastic.

6. A storage battery as defined in claim 5 wherein the casing includes side walls and end walls, and the retaining means includes a lip depending from the casing top wall within which the upper ends of the side and end walls nest, and means for securing the lip to the side and end walls.

7. A storage battery as defined in claim 6 wherein the securing means is an adhesive.

8. A storage battery as defined in claim 6 wherein the securing means are interlocking elements carried by the interior surface of the lip and the exterior surfaces of the side and end walls.

9. A storage battery as defined in claim 1 wherein the cover is a member separate from the battery casing, and including positioning means for spacing the cover above the casing top wall.

10. A storage battery as defined in claim 9 wherein the positioning means project from the interior of the cover for seating upon the top wall of the casing.

11. A storage battery as defined in claim 10 wherein the retaining means holds the positioning means against the casing top wall.

12. A storage battery as defined in claim 9 wherein the positioning means also seat against the side walls of the casing, so as to space the longitudinal edges of the cover away from the casing side walls.

13. A storage battery as defined in claim 12 wherein the positioning means are so positioned with respect to the longitudinal edges of the cover that when the positioning means engage the top and side walls of the casing, the longitudinal edges of the cover are below the level of the casing top wall.

14. A storage battery as defined in claim 12 wherein the positioning means are ribs, each rib having a stepped configuration for accommodating the corner of the battery casing where the top and side walls of the casing meet.

15. A storage battery as defined in claim 9 wherein the cover is flexible.

16. A storage battery as defined in claim 9 wherein the retaining means includes an element adapted to extend from each longitudinal side of the cover around the side and bottom walls of the battery casing.

17. A storage battery as defined in claim 16, wherein the element is a strap, and including fastening means for connecting the strap to both longitudinal sides of the cover.

18. A storage battery as defined in claim 17 wherein the strap is formed of a flexible and resilient material.

19. A storage battery as defined in claim 1 wherein the positioning means are ribs projecting inwardly from the cover, the cover and ribs being integrally formed of a single piece of molded plastic.

* * * * *